(12) United States Patent
Li et al.

(10) Patent No.: US 11,543,531 B2
(45) Date of Patent: Jan. 3, 2023

(54) SEMI-AUTOMATIC LIDAR ANNOTATION SYSTEM FOR AUTONOMOUS DRIVING

(71) Applicants: Dalong Li, Troy, MI (US); Alex Smith, LaSalle (CA); Stephen Horton, Rochester, MI (US)

(72) Inventors: Dalong Li, Troy, MI (US); Alex Smith, LaSalle (CA); Stephen Horton, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 1050 days.

(21) Appl. No.: 16/224,973

(22) Filed: Dec. 19, 2018

(65) Prior Publication Data

US 2020/0200907 A1 Jun. 25, 2020

(51) Int. Cl.

| | |
|---|---|
| G01C 3/08 | (2006.01) |
| G01S 17/89 | (2020.01) |
| G06T 7/70 | (2017.01) |
| G05D 1/02 | (2020.01) |
| G05D 1/00 | (2006.01) |
| G06T 17/05 | (2011.01) |
| G01S 17/931 | (2020.01) |
| G06V 20/58 | (2022.01) |
| G06V 20/64 | (2022.01) |

(52) U.S. Cl.
CPC ............ *G01S 17/89* (2013.01); *G01S 17/931* (2020.01); *G05D 1/0088* (2013.01); *G05D 1/024* (2013.01); *G06T 7/70* (2017.01); *G06T 17/05* (2013.01); *G06V 20/58* (2022.01); *G06V 20/64* (2022.01); *G05D 2201/0213* (2013.01); *G06T 2207/10028* (2013.01); *G06T 2207/30252* (2013.01)

(58) Field of Classification Search
CPC ......... G01S 17/89; G01S 17/931; G06T 7/70; G06T 17/05; G06T 2207/10028; G06T 2207/30252; G06V 20/58; G06V 20/64; G05D 1/0088; G05D 1/024; G05D 2201/0213
See application file for complete search history.

(56) References Cited

U.S. PATENT DOCUMENTS

| | | | |
|---|---|---|---|
| 8,020,657 | B2 | 9/2011 | Allard et al. |
| 2018/0068206 | A1 | 3/2018 | Pollach et al. |
| 2018/0189578 | A1 | 7/2018 | Yang et al. |
| 2018/0203445 | A1 | 7/2018 | Micks et al. |
| 2020/0082614 | A1* | 3/2020 | Xu .......................... G01S 17/89 |
| 2020/0086863 | A1* | 3/2020 | Rosman ............... B60W 30/09 |
| 2020/0134372 | A1* | 4/2020 | Roy Chowdhury . G05D 1/0221 |

* cited by examiner

*Primary Examiner* — Mark Hellner
(74) *Attorney, Agent, or Firm* — Ralph E. Smith

(57) ABSTRACT

A semi-automatic three-dimensional light detection and ranging (LIDAR) point cloud data annotation system and method for autonomous driving of a vehicle involve filtering 3D LIDAR point cloud and normalizing the filtered 3D LIDAR point cloud data relative to the vehicle to obtain normalized 3D LIDAR point cloud data, quantizing the normalized 3D LIDAR point cloud data by dividing it into a set of 3D voxels, projecting the set of 3D voxels to a 2D birdview, identifying a possible object by applying clustering to the 2D birdview projection, obtaining an annotated 2D birdview projection including annotations by a human annotator via the annotation system regarding whether the bounding box corresponds to a confirmed object and a type of the confirmed object, and converting the annotated 2D birdview projection to back into annotated 3D LIDAR point cloud data.

18 Claims, 3 Drawing Sheets

SEMI-AUTOMATIC LIDAR ANNOTATION SYSTEM FOR AUTONOMOUS DRIVING

FIELD

The present application generally relates to vehicle advanced driver assistance systems (ADAS) and, more particularly, to an improved semi-automatic light detection and ranging (LIDAR) annotation system for autonomous driving.

BACKGROUND

Some vehicle advanced driver assistance systems (ADAS) utilize light detection and ranging (LIDAR) systems to capture information. LIDAR systems emit laser light pulses and capture pulses that are reflected back by surrounding objects. By analyzing the return times and wavelengths of the reflected pulses, three-dimensional (3D) LIDAR point clouds are obtained. Each point cloud comprises a plurality of reflected pulses in a 3D (x/y/z) coordinate system). These point clouds could be used to detect objects (other vehicles, pedestrians, traffic signs, etc.). It is typically difficult, however, to distinguish between different types of objects without using extensively trained deep neural networks (DNNs). This requires a substantial amount of labeled training data (e.g., manually annotated 3D LIDAR point clouds), which increases costs. Accordingly, while such ADAS systems work well for their intended purpose, there remains a need for improvement in the relevant art.

SUMMARY

According to one example aspect of the invention, a semi-automatic three-dimensional (3D) light detection and ranging (LIDAR) point cloud data annotation system is presented. In one exemplary implementation, the annotation system comprises: a LIDAR system configured to emit laser light pulses and capture reflected laser light pulses from a vehicle collectively forming 3D LIDAR point cloud data surrounding the vehicle and a control system configured to: receive the 3D LIDAR point cloud data, filter the 3D LIDAR point cloud data to remove data points that are not indicative of objects to obtain filtered 3D LIDAR point cloud data, normalize the filtered 3D LIDAR point cloud data relative to the vehicle to obtain normalized 3D LIDAR point cloud data, quantize the normalized 3D LIDAR point cloud data by dividing it into a set of 3D voxels, project the set of 3D voxels to a two-dimensional (2D) birdview, identify a possible object by applying clustering to the 2D birdview projection, obtain an annotated 2D birdview projection including annotations by a human annotator via the control system regarding whether the bounding box corresponds to a confirmed object and a type of the confirmed object, and convert the annotated 2D birdview projection to back into annotated 3D LIDAR point cloud data.

In some implementations, the control system is further configured to track the confirmed object during a future period to obtain an additional 2D birdview projection and convert the additional 2D birdview projection to additional annotated 3D LIDAR point cloud data. In some implementations, the control system is configured to obtain the additional annotated 3D LIDAR point cloud data without further input from the human annotator.

In some implementations, the control system is configured to convert the annotated 2D birdview projection to the annotated 3D LIDAR point cloud data by vertically moving the bounding box to identify a top and a bottom of the confirmed object. In some implementations, the control system is configured to filter the 3D LIDAR point cloud data to remove road lane lines.

In some implementations, the control system is configured to normalize the filtered 3D LIDAR point cloud data based on a configuration of the LIDAR system relative to the vehicle. In some implementations, the control system is configured to perform the clustering by applying connected component labeling to the 2D birdview projection to identify the possible object.

In some implementations, the control system is further configured to output the annotated 3D LIDAR point cloud data to a separate training system. In some implementations, receipt of the annotated 3D LIDAR point cloud data causes the training system to train an object detection model and output the trained object detection model to the vehicle for use by its advanced driver assistance system (ADAS) to perform object detection. In some implementations, the object detection model is a deep neural network (DNN).

According to another example aspect of the invention, a semi-automatic 3D LIDAR point cloud data annotation method for autonomous driving of a vehicle is presented. In one exemplary implementation, the method comprises: receiving, by an annotation system and from a LIDAR system, 3D LIDAR point cloud data obtained by emitting laser light pulses and capturing reflected laser light pulses, filtering, by the annotation system, the 3D LIDAR point cloud data to remove data points that are not indicative of objects to obtain filtered 3D LIDAR point cloud data, normalizing, by the annotation system, the filtered 3D LIDAR point cloud data relative to the vehicle to obtain normalized 3D LIDAR point cloud data, quantizing, by the annotation system, the normalized 3D LIDAR point cloud data by dividing it into a set of 3D voxels, projecting, by the annotation system, the set of 3D voxels to a 2D birdview, identifying, by the annotation system, a possible object by applying clustering to the 2D birdview projection, obtaining, by the annotation system, an annotated 2D birdview projection including annotations by a human annotator via the annotation system regarding whether the bounding box corresponds to a confirmed object and a type of the confirmed object, and converting, by the annotation system, the annotated 2D birdview projection to back into annotated 3D LIDAR point cloud data.

In some implementations, the method further comprises: tracking, by the annotation system, the confirmed object during a future period to obtain an additional 2D birdview projection, and converting, by the annotation system, the additional 2D birdview projection to additional annotated 3D LIDAR point cloud data. In some implementations, the annotation system is configured to obtain the additional annotated 3D LIDAR point cloud data without further input from the human annotator.

In some implementations, converting the annotated 2D birdview projection to the 3D LIDAR point cloud data comprises vertically moving the bounding box to determine a top and a bottom of the confirmed object. In some implementations, filtering the 3D LIDAR point cloud data comprises removing road lane lines.

In some implementations, normalizing the filtered 3D LIDAR point cloud data is based on a configuration of the LIDAR system relative to the vehicle. In some implementations, the clustering comprises applying connected component labeling to the 2D birdview projection to identify the possible object.

In some implementations, the method further comprises outputting, from the annotation system and to a separate training system, the annotated 3D LIDAR point cloud data. In some implementations, receipt of the annotated 3D LIDAR point cloud data causes the training system to train an object detection model and output the trained object detection model to the vehicle for use by its ADAS to perform object detection. In some implementations, the object detection model is a DNN.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As discussed above, there exists a need for improvement in automated driver assistance (ADAS) systems that utilize light detection and ranging (LIDAR) to obtain three-dimensional (3D) LIDAR point cloud data for object detection. It will be appreciated that the term "ADAS" as used herein includes driver assistance systems (lane keeping, adaptive cruise control, etc.) as well as partially and fully autonomous driving systems. A conventional ADAS for object detection utilizes a deep neural network (DNN) trained by machine learning with annotated training data. This requires a substantial amount of labeled training data, which is typically manually annotated by human users, thereby increasing costs. Accordingly, a semi-automatic 3D LIDAR point cloud annotation system is presented. This 3D LIDAR point cloud annotation system filters and normalizes raw 3D LIDAR point cloud data to obtain voxels that are then projected to a two-dimensional (2D) birdview where potential objects are identified by bounding boxes. A human annotator then manually annotates (accepts, rejects, adjusts, etc.) the potential objects and also adds classifiers (car, pedestrian, sign, etc.). The system then converts the annotated 2D birdview projection back into annotated 3D LIDAR point cloud data, which is used for improved model training. In some implementations, annotated objects in the 2D birdview projection are tracked such that additional annotated 3D LIDAR point cloud data can be obtained without further human annotation. The term "birdview" as used herein refers to a bird's-eye elevated view of the area surrounding a vehicle (e.g., with a perspective as though the observer were a bird).

Figure 1:
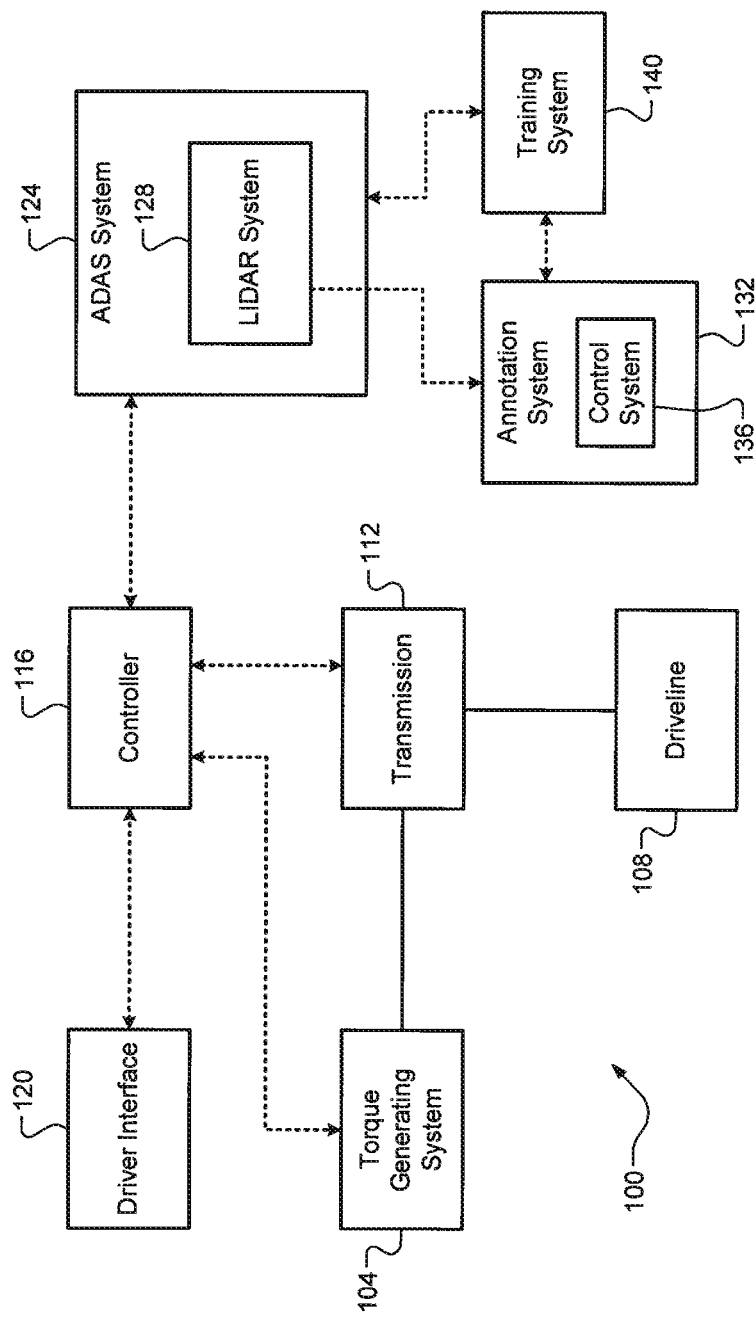
FIG. 1 is a functional block diagram of an example vehicle having an advanced driver assistance system (ADAS) with a light detection and ranging (LIDAR) system according to some implementations of the present disclosure.

Referring now to FIG. 1, a functional block diagram of an example vehicle 100 is illustrated. The vehicle 100 comprises a torque generating system 104 (an engine, an electric motor, combinations thereof, etc.) that generates drive torque that is transferred to a driveline 108 via a transmission 112. A controller 116 controls operation of the torque generating system 104, such as to generate a desired drive torque based on a driver input via a driver interface 120 (a touch display, an accelerator pedal, combinations thereof, etc.). The vehicle 100 further comprises an ADAS 124 having a LIDAR system 128. While the ADAS 124 is illustrated as being separate from the controller 116, it will be appreciated that the ADAS 124 could be incorporated as part of the controller 116, or the ADAS 124 could have its own separate controller. The LIDAR system 128 emits laser light pulses and captures reflected laser light pulses (from other vehicles, structures, traffic signs, etc.) that collectively form captured 3D LIDAR point cloud data. It will be appreciated that the ADAS 124 could include other suitable systems, such as, but not limited to, a radio detection and ranging (RADAR) system, a camera/lens system, an inertial motion unit (IMU) system, a real-time kinematic (RTK) system, and the like. The ADAS 124 communicates with a remote annotation system 132 that is separate from the vehicle 100 but could be described as including the LIDAR system 128 and its own control system 136. The annotation system 132 interacts with a human annotator to generate annotated 3D LIDAR point cloud data, which is then used to train models such as DNNs for object detection. This model training could occur at a separate control or training system 140, at the ADAS 124 or controller 116, or some combination thereof.

Figure 2:
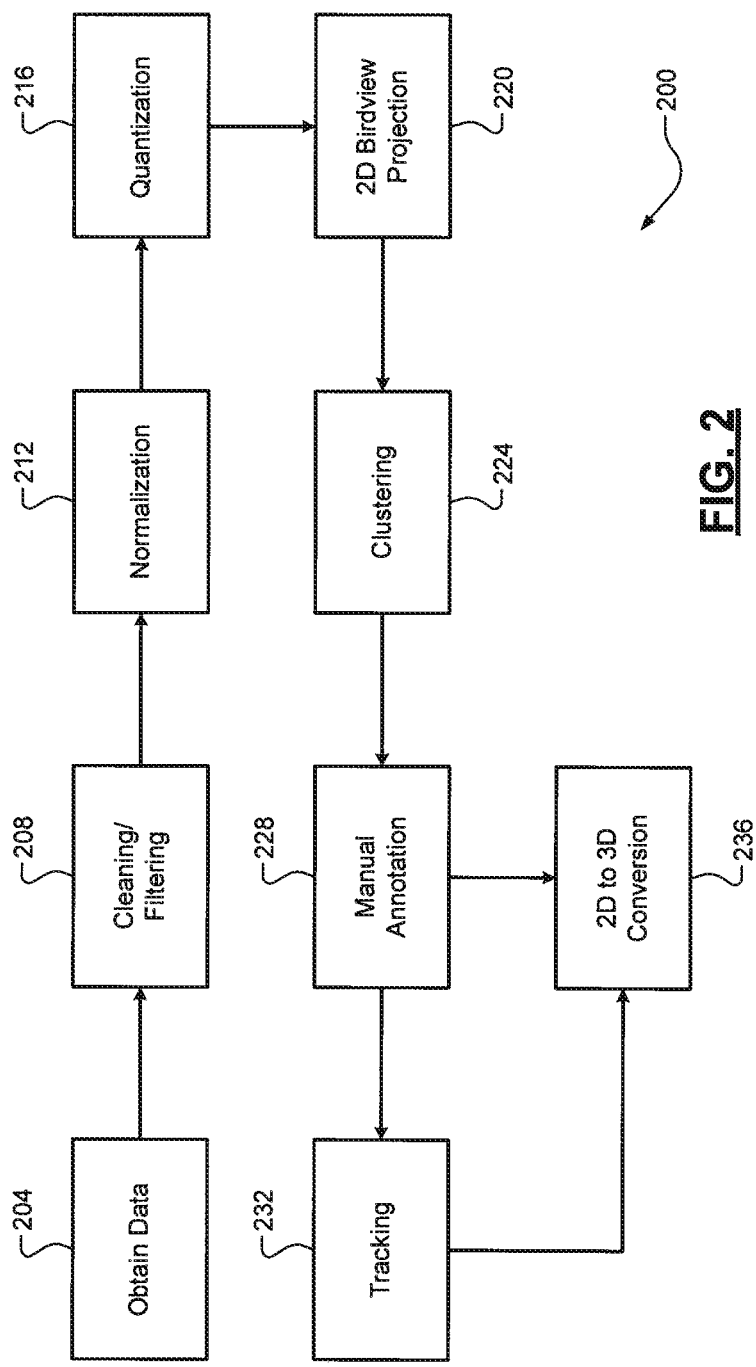
FIG. 2 is a functional block diagram of an example semi-automatic 3D LIDAR point cloud annotation architecture according to some implementations of the present disclosure.

Referring now to FIG. 2, a functional block diagram of an example semi-automatic 3D LIDAR point cloud annotation architecture 200 is illustrated. As mentioned above, it will be appreciated that this architecture 200 could be implemented primarily by the annotation system 132, but portions of the techniques described herein could be implemented by the ADAS 124 and/or the controller 116 of the vehicle 100 or the control system 136 (3D LIDAR point cloud capturing, model training, trained model usage, etc.). At 204, 3D LIDAR point cloud data is obtained (e.g., after being captured using the LIDAR system 128). This could include, for example, analyzing return times and wavelengths of laser light pulses transmitted from and reflected back to the LIDAR system 128. It will be appreciated that the 3D LIDAR point cloud data could also be obtained from other LIDAR systems. At 208, the 3D LIDAR point cloud data is cleansed or filtered to remove data points that are not likely objects. One example of the filtering is the removal of data points corresponding to road lane lines or marks by thresholding based on the intensity of the LIDAR measurements. It will be appreciated that the 3D LIDAR point cloud data could also be filtered to remove other features, such as known landmarks/buildings. At 212, the filtered 3D LIDAR point cloud data is normalized. This could include, for example, normalizing the data based on a known configuration of the LIDAR system 128, e.g., with respect to the vehicle 100 (mounting position/angle, vehicle size, etc.) by applying a transformation to compensate for any positional and/or orientational differences between different LIDAR sensor mounting configurations.

At 216, the normalized 3D LIDAR point cloud data is quantized by dividing it into groups or related (e.g., nearby) data points, also known as 3D voxels. At 220, the voxels are projected to a 2D birdview. This could include, for example only, projecting the 3D voxels onto a ground plane. In other words, the x-y coordinates could be sliced or divided into vertical bins. It will be appreciated, however, that any suitable 3D voxel or point cloud to 2D birdview or perspective projection conversion technique could be utilized. At 224, clustering is performed to identify possible object(s) in the 2D birdview projection, which are indicated by bounding boxes displayed to the human annotator via the annotation system 132. Any suitable clustering technique could be utilized, such as, but not limited to, Euclidean distance based clustering and image-based techniques such as connected component labeling (i.e., identifying groups of neighboring or connected pixels as possible objects). At 228, the human annotator provides input with respect to the bounding boxes (accept as an object, reject as an object, adjust a bounding box with respect to the object, draw a new bounding box around a previously unidentified object, provide a label indicating a type of the object, etc.). Any object(s) having bounding boxes after annotation can be referred to as confirmed objects (i.e., confirmed by the human annotator). At optional 232, the object is tracked and an additional annotated 2D birdview projection is obtained without additional input from the human annotator. At 236, the annotated 2D birdview projection(s) is/are converted to annotated 3D LIDAR point cloud data and output (e.g., to control system 136).

Figure 3:
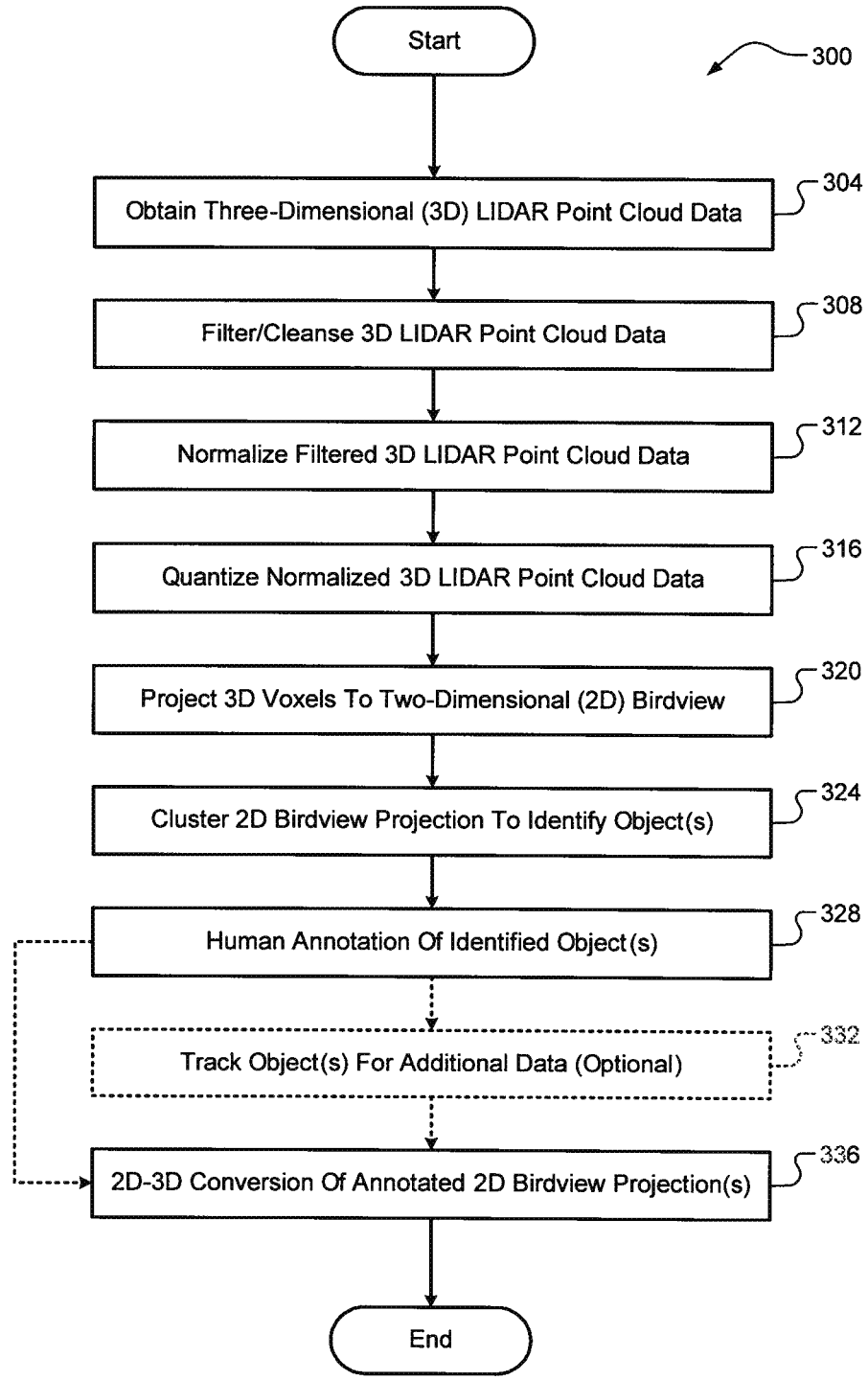
FIG. 3 is a flow diagram of an example semi-automatic 3D LIDAR point cloud annotation method according to some implementations of the present disclosure.

Referring now to FIG. 3, a flow diagram of a semi-automatic 3D LIDAR point cloud data annotation method 300 is illustrated. At 304, 3D LIDAR point cloud data is obtained (e.g., from the LIDAR system 128). At 308, the 3D LIDAR point cloud data is filtered or cleansed to remove data that is likely not indicative of possible objects. For example, road lane lines could be removed. At 312, the filtered 3D LIDAR point cloud data is normalized based on a known position/configuration of the LIDAR system 128 (mounting angle, vehicle size, etc.). At 316, the normalized 3D LIDAR point cloud data is normalized to obtain a set of 3D voxels. At 320, the 3D voxels are projected to a 2D birdview. At 324, clustering is performed to identify one or more possible objects in the 2D birdview projection. At 328, a human annotator provides input to annotate the 2D birdview projection (accept/reject a possible object, adjust a bounding box of a possible object, provide a type of the object, etc.). At optional 332, the object(s) are tracked to obtain one or more additional annotated 2D birdview projections without requiring additional annotation by the human annotator. At 336, the annotated 2D birdview projection(s) are converted back into 3D to obtain one or more sets of annotated 3D LIDAR point cloud data. This annotated 3D LIDAR point cloud data can then be used, e.g., by control system 136 or training system 140, to train object detection models for autonomous driving purposes. The method 300 then ends or returns to 304.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A semi-automatic three-dimensional (3D) light detection and ranging (LIDAR) point cloud data annotation system, the annotation system comprising:
   a LIDAR system configured to emit laser light pulses and capture reflected laser light pulses from a vehicle collectively forming 3D LIDAR point cloud data surrounding the vehicle; and
   a control system configured to:
   receive the 3D LIDAR point cloud data;
   filter the 3D LIDAR point cloud data to remove data points that are not indicative of objects to obtain filtered 3D LIDAR point cloud data;
   normalize the filtered 3D LIDAR point cloud data relative to the vehicle to obtain normalized 3D LIDAR point cloud data;
   quantize the normalized 3D LIDAR point cloud data by dividing it into a set of 3D voxels;
   project the set of 3D voxels to a two-dimensional (2D) birdview;
   identify a possible object by applying clustering to the 2D birdview projection;
   obtain an annotated 2D birdview projection including annotations by a human annotator via the control system regarding whether the bounding box corresponds to a confirmed object and a type of the confirmed object;
   convert the annotated 2D birdview projection to back into annotated 3D LIDAR point cloud data;
   track the confirmed object during a future period to obtain an additional 2D birdview projection; and
   convert the additional 2D birdview projection to additional annotated 3D LIDAR point cloud data.

2. The annotation system of claim 1, wherein the control system is configured to obtain the additional annotated 3D LIDAR point cloud data without further input from the human annotator.

3. The annotation system of claim 1, wherein the control system is configured to convert the annotated 2D birdview projection to the annotated 3D LIDAR point cloud data by vertically moving the bounding box to identify a top and a bottom of the confirmed object.

4. The annotation system of claim 1, wherein the control system is configured to filter the 3D LIDAR point cloud data to remove road lane lines.

5. The annotation system of claim 1, wherein the control system is configured to normalize the filtered 3D LIDAR point cloud data based on a configuration of the LIDAR system relative to the vehicle.

6. The annotation system of claim 1, wherein the control system is configured to perform the clustering by applying connected component labeling to the 2D birdview projection to identify the possible object.

7. The annotation system of claim 1, wherein the control system is further configured to output the annotated 3D LIDAR point cloud data to a separate training system.

8. The annotation system of claim 7, wherein receipt of the annotated 3D LIDAR point cloud data causes the training system to train an object detection model and output the trained object detection model to the vehicle for use by its advanced driver assistance system (ADAS) to perform object detection.

9. The annotation system of claim 8, wherein the object detection model is a deep neural network (DNN).

10. A semi-automatic three-dimensional (3D) light detection and ranging (LIDAR) point cloud data annotation method for autonomous driving of a vehicle, the method comprising:
- receiving, by an annotation system and from a LIDAR system, 3D LIDAR point cloud data obtained by emitting laser light pulses and capturing reflected laser light pulses;
- filtering, by the annotation system, the 3D LIDAR point cloud data to remove data points that are not indicative of objects to obtain filtered 3D LIDAR point cloud data;
- normalizing, by the annotation system, the filtered 3D LIDAR point cloud data relative to the vehicle to obtain normalized 3D LIDAR point cloud data;
- quantizing, by the annotation system, the normalized 3D LIDAR point cloud data by dividing it into a set of 3D voxels;
- projecting, by the annotation system, the set of 3D voxels to a two-dimensional (2D) birdview;
- identifying, by the annotation system, a possible object by applying clustering to the 2D birdview projection;
- obtaining, by the annotation system, an annotated 2D birdview projection including annotations by a human annotator via the annotation system regarding whether the bounding box corresponds to a confirmed object and a type of the confirmed object;
- converting, by the annotation system, the annotated 2D birdview projection to back into annotated 3D LIDAR point cloud data;
- tracking, by the annotation system, the confirmed object during a future period to obtain an additional 2D birdview projection; and
- converting, by the annotation system, the additional 2D birdview projection to additional annotated 3D LIDAR point cloud data.

11. The method of claim 10, wherein the annotation system is configured to obtain the additional annotated 3D LIDAR point cloud data without further input from the human annotator.

12. The method of claim 10, wherein converting the annotated 2D birdview projection to the 3D LIDAR point cloud data comprises vertically moving the bounding box to determine a top and a bottom of the confirmed object.

13. The method of claim 10, wherein filtering the 3D LIDAR point cloud data comprises removing road lane lines.

14. The method of claim 10, wherein normalizing the filtered 3D LIDAR point cloud data is based on a configuration of the LIDAR system relative to the vehicle.

15. The method of claim 10, wherein the clustering comprises applying connected component labeling to the 2D birdview projection to identify the possible object.

16. The method of claim 10, further comprising outputting, from the annotation system and to a separate training system, the annotated 3D LIDAR point cloud data.

17. The method of claim 16, wherein receipt of the annotated 3D LIDAR point cloud data causes the training system to train an object detection model and output the trained object detection model to the vehicle for use by its advanced driver assistance system (ADAS) to perform object detection.

18. The method of claim 17, wherein the object detection model is a deep neural network (DNN).

* * * * *